United States Patent
Podeszfa et al.

(10) Patent No.: US 8,674,154 B2
(45) Date of Patent: Mar. 18, 2014

(54) APPARATUS AND METHOD FOR CONDUCTING THERMOLYSIS OF PLASTIC WASTE IN CONTINUOUS MANNER

(75) Inventors: Andrzej Podeszfa, Gliwice (PL); Bartlomiej Karbowy, Warsaw (PL); Bartlomiej Samardakiewicz, Pruszków (PL)

(73) Assignee: Clariter IP S.A., Grand-Duché du (LU)

( * ) Notice: Subject to any disclaimer, the term of this patent is extended or adjusted under 35 U.S.C. 154(b) by 125 days.

(21) Appl. No.: 13/126,811

(22) PCT Filed: Apr. 28, 2009

(86) PCT No.: PCT/IB2009/051725
§ 371 (c)(1),
(2), (4) Date: Jul. 12, 2011

(87) PCT Pub. No.: WO2010/049824
PCT Pub. Date: May 6, 2010

(65) Prior Publication Data
US 2011/0259726 A1    Oct. 27, 2011

(30) Foreign Application Priority Data
Oct. 31, 2008    (PL) .......................................... 386410

(51) Int. Cl.
*C07C 1/00*        (2006.01)
*C10B 9/00*        (2006.01)

(52) U.S. Cl.
USPC ........ 585/241; 201/6; 201/8; 201/25; 202/93; 202/96; 202/108; 202/111

(58) Field of Classification Search
USPC ......... 585/241; 201/6, 8, 25; 202/93, 96, 108, 202/111; 110/346, 347
See application file for complete search history.

(56) References Cited

U.S. PATENT DOCUMENTS

| | | | |
|---|---|---|---|
| 380,619 A | 4/1888 | Cram | |
| 4,225,392 A * | 9/1980 | Taylor | ............................ 202/93 |

(Continued)

FOREIGN PATENT DOCUMENTS

| | | |
|---|---|---|
| EP | 0276081 A2 | 7/1988 |
| EP | 0276081 A2 | 7/1998 |

(Continued)

OTHER PUBLICATIONS

International Search Report published May 11, 2010 for PCT/IB2009/051725, filed Apr. 28, 2009.

(Continued)

*Primary Examiner* — Nina Bhat
(74) *Attorney, Agent, or Firm* — Fleit Gibbons Gutman Bongini & Bianco PL; Martin Fleit; Paul D. Bianco

(57) ABSTRACT

The invention provides an apparatus for thermolysis of waste plastics, particularly polyolefins. The apparatus includes a feeding system, an extruder, a main thermolysis reactor, a dual propeller/mixer housed within the reactor, and a discharging system. The height of the thermolysis reactor is at least 1.5 times bigger than the diameter. The apparatus is arranged such that the extruder follows the plastic feeding system, the thermolysis reactor follows the extruder, and the discharge system follows the thermolysis reactor. The invention also provides a method for using the apparatus for thermolysis of waste plastics. In this method, reaction feedstock, reaction residuals, and reaction products are removed continuously.

20 Claims, 1 Drawing Sheet

(56) References Cited

U.S. PATENT DOCUMENTS

| | | | |
|---|---|---|---|
| 4,919,686 A * | 4/1990 | Edwards | 48/197 R |
| 5,292,862 A | 3/1994 | Miura et al. | |
| 5,753,086 A * | 5/1998 | Guffey et al. | 202/88 |
| 5,821,395 A | 10/1998 | Price et al. | |
| 6,534,689 B1 | 3/2003 | Stankevitch | |
| 6,861,568 B1 * | 3/2005 | Guffey et al. | 585/241 |
| 2009/0050525 A1 | 2/2009 | Sappok et al. | |
| 2010/0282587 A1 * | 11/2010 | Brentnall et al. | 201/2 |

FOREIGN PATENT DOCUMENTS

| | | |
|---|---|---|
| PL | P-383709 | 11/2007 |
| PL | P380619 | 3/2008 |
| WO | 2006092306 A1 | 9/2006 |

OTHER PUBLICATIONS

Jerzy Badura et al, "Method of catalytic depolymerisation of polyolefin waste and installation for polyolefin waste catalytic depolymerisation", P380619, Mar. 17, 2008, EJK Spólka Z Ograniczona Odpowiedzialnoścía. Janicka Malgorzata.

P-383709, "System for conducting pyrolysis of plastic waste and method of conducting pyrolysis, involving the removal of carbonization products and post-reaction residue".

International Preliminary Report on Patentability issued May 3, 2011 for PCT/IB2009/051725, filed Apr. 28, 2009.

* cited by examiner

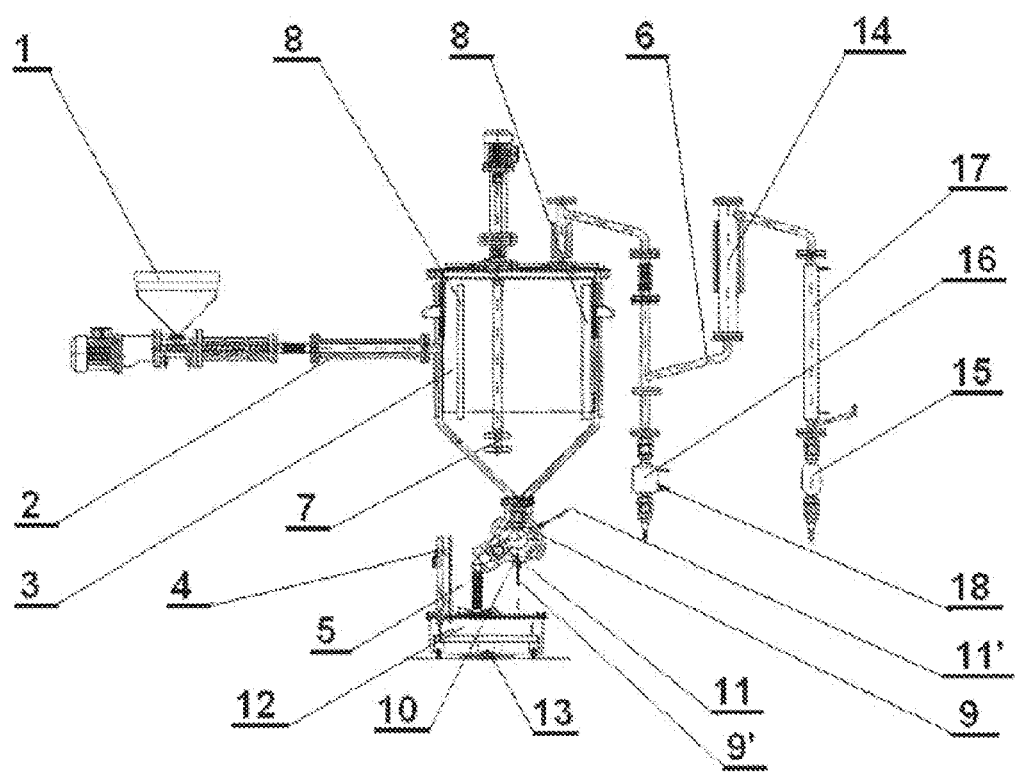

APPARATUS AND METHOD FOR CONDUCTING THERMOLYSIS OF PLASTIC WASTE IN CONTINUOUS MANNER

FIELD OF THE INVENTION

This invention provides a method and apparatus for conducting thermolysis of plastic waste, particularly polyolefins, and a method of thermolysis with continuous feeding and continuous discharging of carbonizable substances and reaction leftovers.

BACKGROUND OF THE INVENTION

U.S. Pat. No. 6,534,689—description defines a method of pyrolysis of the waste plastics leading to fuel production. To separate solid particles from liquids the cyclone uses high vehicle velocity and high inert gas temperature as a heat transfer carrier. This invention utilizes inert gas and hydrocarbon vapours as heating medium.

Patent P—380619—description defines a method and apparatus for catalytic depolymerization of polyolefinic waste plastics characterized by two reactors in which depolymerization takes place. There is one tank reactor and a second flow reactor operating in cooperation. Shredded plastic waste is first heated, melted, and pumped under the reaction medium surface. Later the plastic molten mass is dispersed in the reaction medium. The depolymerization process occurs in the presence of the catalyst. From the reactor bottom reacting mixture is pumped to the flow reactor in which it is heated up to 400° C. The reaction occurs under normal and negative pressure. Pressure in the reactor depends on the planned outcome for product properties. Inside the flow reactor depolymerization takes place. Gas and liquid mixture comes in to the tank reactor where it is split into gas and liquid fraction.

The liquid phase is heated up and melts incoming plastic feedstock. In the bottom reactor area the initial reaction takes place in 360° C. In the upper section, the split into gas and liquids takes place in around 400° C. Hydrocarbon vapours produced come thru the active, chemically-neutralizing filter and are condensed. The process is continuous.

Patent P—383709—description defines an apparatus and method for depolymerization of polyolefinic waste plastics, especially polyolefins, with removing reaction leftovers and residues. The apparatus includes a feeding conveyor, a pyrolysis reactor, and a discharging section characterized by a gas engaging stabilizer equipped with a mixer and working in close loop with at least one external pyrolysis reactor with screw or ribbon mixer and pipe that closes the loop. The depolymerization process is carried out in the presence of inert gas and characterized by a reactor with enforced dual flow in which on direction is used to discharge the reactor's residue.

SUMMARY OF THE INVENTION

The principal aim of the instant invention is thermolysis of waste plastics, especially polyolefins. The thermolysis method is carried out continuously with continuous feeding and discharging the apparatus while at the same time minimizing coke formation and carbonizable products. The instant invention includes an apparatus for conducting waste plastic pyrolysis. The apparatus includes a feeding system, a main thermolysis reactor, and a discharging system characterized in that after the feeding system there is an extruder followed by a thermolysis reactor which height is 1.5 times bigger than its diameter and is equipped with a dual mixer.

Favourably, the thermolysis reactor has at least two vertical wall baffles.

Favourably, the thermolysis reactor's height is two times bigger than its diameter.

Favourably, the thermolysis reactor is equipped with an independent accessory mixer.

Favourably, the mixer is a high speed mixer with different propeller blade angles.

Favourably, the mixer is a double turbine mixer.

Favourably, the mixer is equipped with additional stabilizing bars.

Favourably, the discharge system constitutes a discharge valve.

Favourably, the discharge system constitutes a discharge system.

Favourably, the discharge system is equipped with an upper discharge valve, a discharge chamber, a bottom discharge valve, and a discharge tank placed on the scale.

Favourably, the upper discharge valve and bottom discharge valve are equipped with drain mechanisms.

Favourably, the drain mechanism is a sealed hand drain bar.

Favourably, the thermolysis apparatus has at least one thermo separation column for product condensation.

Favourably, the upper section of the thermo condensing column is heated.

Favourably, the thermo separation column is connected to two separate storage tanks, one for the light fraction and the second for the heavy fraction.

Favourably, the light fraction storage tank has a cold water jacket and the heavy fraction tank has a hot water jacket.

The operating mode of the waste plastic thermolysis in the presence of inert gas plasticized at a temperature from 180° C. up to the reactor temperature. The plasticized polymer is fed to the thermolysis reactor, where at 350-450° C. and at mixer speed 30-1500 rpm, thermolysis is carried out, in which reaction residues are discharged continuously and the thermo separation column continuously condenses and divides two streams of fractions, one below 180° C. and a second above 180° C.

Favourably, thermolysis is carried out at 390 to 450° C.

Favourably, thermolysis is carried out at a mixer speed of 200 to 700 rpm.

Favourably, plastic wastes are extruded at 250 to 370° C.

Favourably, the upper section of the thermo separation column, during operation of the thermolysis reactor, is heated up causing self condensation of one of the fractions.

Favourably, the light fraction is received in the cold water jacket tank at 20° C. and the heavy fraction is collected in the hot water jacket tank at 70 to 80° C.

An advantage of the instant invention is the small size of the process equipment, enabling thermolysis to be carried out continuously and giving repeatable end products at a lower process temperature without using catalysts.

The process of thermolysis is very stable with little temperature difference between molten plastic and working temperature of the thermolysis reactor. It affects the overall energy consumption and lowers feedstock residence time in the reactor. Implementing the reactor with vertical baffles enables proper mixing.

Furthermore, using high speed dual mixers enables more efficient mixing and improved radial and axial temperature distribution.

Right/left mixer rotation enables discharging the reactor in both mixer's rotating directions.

Additional advantage comes from the thermo separation column and its heated/non heated upper condensing section. The thermo separation column operates in a non-heated mode by heating the vapours coming from the thermolysis reactor to a certain temperature and regulating the volume of the vapours coming up and down the column.

An additional advantage of the system is the residue discharge system which includes high temperature-resistant discharge valves.

The products of the described system are solvents for further processing represented as light fraction and oils and waxes represented by heavy fraction.

BRIEF DESCRIPTION OF THE DRAWINGS

FIG. 1 is a schematic showing the described system for thermolysis of the waste plastic or plastics, especially polyolefins.

DETAILED DESCRIPTION OF THE INVENTION

Example

According to the invention, the apparatus for conducting thermolysis of plastic waste is characterized by a granulated feedstock feeding system (1) operably connected to the extruder (2). Plasticized polymers at 300 to 330° C. are fed to the thermolysis reactor (3) where depolymerization process takes place. The reactor's (3) height is two times bigger than its diameter. Reactor (3) is equipped with a dual high speed propeller (7) having different propeller blade angles. Reactor (3) is equipped with three vertical baffles (8). The thermolysis process is carried out at 390 to 415° C. and at a mixer speed of 200 to 700 rpm. Residuals (4) from the thermolysis process are continuously discharged in discharge system (5). Discharge system (5) is equipped with an upper discharge valve (9), a discharge chamber (10), a lower discharge valve (11), and a discharge tank (12) placed on the scale (13). The upper discharge valve (9) and the lower discharge valve (11) have draining mechanisms, respectively (9') and (11'). Drain mechanisms (9') and (11') are manual. The apparatus includes a thermo separation column (6) for fractional condensation. The upper section of the column (6) is optionally heated.

Column (6) is connected with two receiving tanks dedicated to light (15) and heavy (16) fractions. Storage tank (15) has a cold water jacket (17) and storage tank (16) has a hot water jacket (14).

In thermo separation column (6) continuous two stage condensation is carried out with light fraction condensation at a temperature less than 180° C. (<180) and heavy fraction condensation at a temperature higher than 180° C. (>180). The light fraction is received in cold jacket tank (15) at a temperature of 20° C. and heavy fraction received in hot jacket tank (18) at a temperature of 70 to 80° C. Thermolysis is carried out in the presence of an inert gas—nitrogen. The heavy fraction can be further processed into greases, petroleum jelly, and waxes.

The invention claimed is:

1. A method for thermolysis of waste plastics in presence of an inert gas, the method comprising:
   feeding waste plastics from a feeding system to an extruder;
   plasticizing the waste plastic at a temperature of 180° C. producing molten plastic waste;
   feeding the molten plastic waste to a thermolysis reactor operating at a temperature between 350° C.-450° C.;
   stirring the molten plastic waste at a speed between 30-1500 rpm;
   discharging the waste continuously into a thermo separation column; and
   condensing the waste in the thermo separation column into fraction products; wherein a light fraction is discharged to a first storage tank and boiled to 180° C. and a heavy fraction is discharged to a second storage tank and boiled above 180° C.

2. The method according to claim 1, wherein the thermolysis is carried out at a temperature between 390-415° C. and at a mixing speed between 200-700 rpm.

3. The method according to claim 1, wherein the waste plastic is plasticized in the extruder at a temperature between 250-370° C.

4. The method according to claim 1, wherein the upper section of the thermo separation column is heated during reactor operation causing partial self condensation of the fraction products.

5. The method according to claim 1, wherein the first storage tank for the light fraction product has a cold jacket and the second storage tank for the heavy fraction product has a hot jacket at a temperature between 70-80° C.

6. An apparatus for thermolysis of waste plastic, the apparatus comprising:
   a plastic feeding system;
   an extruder;
   a thermolysis reactor having a height at least 1.5 times bigger than a diameter,
   a dual propeller housed within the thermolysis reactor; and
   a discharging system, wherein the apparatus is operatively arranged such that the extruder follows the plastic feeding system, the thermolysis reactor follows the extruder, and the discharge system follows the thermolysis reactor.

7. The apparatus according to claim 6, wherein the thermolysis reactor further comprises
   two vertical baffles;
   or an independent auxiliary mixer.

8. The apparatus according to claim 6, wherein the dual propeller is a high speed mixer having propeller blades at different angles.

9. The apparatus according to claim 8, wherein the mixer is a high speed propeller.

10. The apparatus according to claim 9, wherein the high speed propeller has auxiliary claws.

11. The apparatus according to claim 6, further comprising a discharge section, wherein the discharge section is a discharge valve or a discharge system.

12. The apparatus according to claim 11, wherein the discharge section is a discharge system including an upper discharge valve, a discharge chamber, a lower discharge valve, and a residual tank placed on a scale.

13. The apparatus according to claim 12, wherein each of the upper discharge valve and lower discharge valve further comprise cleaning mechanisms.

14. The apparatus according to claim 13, wherein the cleaning mechanisms are manual pipe cleaners.

15. The apparatus according to claim 6, further comprising at least one thermo separation column for condensing and separating fraction products of the thermolysis, the thermo separation column having an upper section and a lower section.

16. The apparatus according to claim 15, further comprising a first storage tank and a second storage tank operably connected to the thermo separation column; wherein the first storage tank is for light fraction products of thermolysis and the second storage tank is for heavy fraction products of thermolysis.

17. The apparatus according to claim 16, wherein the first storage tank has a cold water jacket and the second storage tank has a hot water jacket.

18. The apparatus according to claim 15, wherein the upper section of the thermo separation column is configured for heating.

19. The apparatus according to claim 6, wherein the waste plastics are polyolefins.

20. The apparatus according to claim 7, wherein the height of the thermolysis reactor is two times bigger than the diameter.

* * * * *